INVENTORS
Arthur F. Bleiweiss
George Colombo
John B. Dickson

BY

ATTORNEYS

INVENTOR.
Arthur F. Bleiweiss
George Colombo
John B. Dickson

BY

ATTORNEYS

United States Patent Office 3,284,770
Patented Nov. 8, 1966

3,284,770
AUTOMOTIVE VEHICLE TURN SIGNALLING SYSTEM WITH VARIABLE CURRENT DRAIN AND CONSTANT FLASHING RATE
Arthur F. Bleiweiss, New York, George Colombo, East Rockaway, and John B. Dickson, Kew Gardens, N.Y., assignors to Lehigh Valley Industries, Inc., New York, N.Y., a corporation of Delaware
Filed May 13, 1964, Ser. No. 367,142
10 Claims. (Cl. 340—81)

This invention relates to automotive vehicle turn signalling systems and, more particularly, to such a turn signal system in which the rear signal lamps have one intensity for daytime driving and a much lower intensity for nighttime driving.

The present invention is particularly directed to an automotive vehicle turn signalling system of this latter type in which the FPM rate and on-time ratio of a thermomotive flasher remain substantially constant during both daytime and nighttime operation of the signal lamps irrespective of the wide variation in load current drain between the daytime operation and the nighttime operation.

Those skilled in the automotive vehicle signalling art have long known that signal lamps, such as turn signal lamps or stop lamps, which have an intensity bright enough to be distinguished easily from a reasonable distance during daytime driving in bright sunlight are much too bright for nighttime driving and provide too much glare. Accordingly, several different proposals have been made whereby the intensity of the signal lamps can be reduced during nighttime driving as compared to the intensity thereof during daytime driving, and preferably reduced automatically responsive to conditioning of the vehicle for nighttime driving, such as by turning on the parking lamps or headlamps.

One proposed arrangement has been the provision of extra switch means on the headlamp control switch whereby, responsive to operation of this switch from an off position to either of a pair of on positions, a dropping resistor or resistance is cut automatically into series with the rear signal lamps. Thus, during nighttime driving when the parking or headlamps of the vehicle are turned on, the intensity of the turn signal, and possibly also of the stop lamps, is greatly reduced as to the intensity during daytime driving.

Another proposal has involved the use of dual sets of rear signal lamps including, in each set, a high intensity signal lamp for daytime driving and a low intensity signal lamp for nighttime driving, with switching between the high and low intensity lamps being effected automatically responsive to operation of the headlamp control switch. A variation of this system involves the use of dual filament signal lamps, with each signal lamp having a high intensity filament and a low intensity filament. The high intensity filament is operative during daytime driving and the low intensity filament is operative during nighttime driving.

The "flashing" or intermittent illumination of turn signal lamps is effected by incorporation of a cyclic circuit interrupter into the energizing circuit of the turn signal lamps. The most commonly used form of cyclic circuit interrupter is a thermomotive flasher involving a heat expansible operating element controlling a snap action movable member for snapping between two positions to flash the signal lamps. The thermal operating element, such as a "hot wire" or the like, of such a flasher is usually heated by the flow of load current therethrough.

These flashers are relatively inexpensive and fairly reliable, and therefore have found widespread use in automotive turn signalling systems. However, the series type of flashers having the load current flow through the hot wire or other expansible operating element thereof, are sensitive to a great degree to variations in the load current. These variations in the load current affect the FPM or operating rate of the flasher as well as affecting the "on-time ratio" which is the proportion of each cycle during which the signal lamps are lit.

A properly designed thermomotive flasher will operate at a constant FPM rate and with a constant on-time ratio if the current drain therethrough, or the operating voltage impressed thereacross, remains substantially constant. However, with a wide variation in current drain, the FPM rate and the on-time ratio will change very substantially.

For this reason, in an automotive vehicle turn signal system of the type mentioned above wherein the signal lamps have one intensity for daytime operation and a second intensity for nighttime operation, the relatively wide difference in the current drain or load current between daytime operation and nighttime operation results in a corresponding relatively wide divergence between the FPM rates and on-time ratios for daytime and nighttime operation respectively. For example, during daytime driving and with the high intensity operation of the signal lamps, the current drain is rather heavy and thus the flasher will operate at a relatively high FPM rate, with a relatively low on-time ratio. When the signal lamp intensity is substantially reduced, as during nighttime operation, the current drain also is substantially reduced and the flasher will operate at a greatly reduced FPM rate and a correspondingly increased on-time ratio. This condition is undesirable, as standards have been set whereby a flasher, to provide a proper signalling effect which can be understood adequately by the drivers of other cars, should flash the signal lamps at a rate of 60 to 120 FPM or "flashes per minute."

The fundamental point of the foregoing discussion is that the operating rate of any series type thermomotive flasher is dependent upon the lamp load current effective upon the thermally responsive operating element thereof, such as a hot wire or a ribbon. The higher the current flow effective upon the operating element, the faster the latter will heat and expand to a point providing for snapping of the flasher to the "off" position. Conversely, the lower the current flow effective upon the operating element, the longer will be the time required for the operating element to expand sufficiently for the flasher to snap to the "off" position.

Recognizing this principle, the present invention provides a means whereby the current flow effective upon the operating element of a flasher can be maintained at the same rate even under two different sets of operating conditions wherein the current drawn by the signal lamps has two widely different values. Specifically, the present invention is based upon the principle of bleeding off current from the thermal operating element during the time that the current drawn by the signal lamps, for example, is at a relatively high value, and terminating such bleed-off during the time the current drawn by the signal lamps is at a substantially lower value. Thus, and responsive to the actuation of a headlamp control switch, a bleed-off resistor which is normally in effective circuit connection with the operating element of a flasher when the signal lamps are drawing a high current, is effectively cut out of circuit with the operating element of the flasher when the current drawn by the signal lamps drops to the lower or nighttime value.

While not limited thereto, the principles of the invention are particularly applicable to a vane type of flasher such as the type described and shown in Welsh U.S. Patent 2,756,304, issued July 24, 1956. Flashers of the type shown in this Welsh patent have a vane of preferably electrically conductive resilient material which is given a pre-set deformation so that it is normally bent about one bend line. By attaching a thermally expansible pull ribbon or wire to the vane to extend along or at a small angle to such bend line, and with the pull element atached in the cold and contracted position, the vane is stress-deformed to be bent about another bend line extending at an angle to the first bend line. The pull element is also preferably electrically conductive but essentially must be a heat expansible type of metal. When the pull ribbon or wire is heated and expands, the vane will snap to its initial bent condition about the first bend line and, when the pull ribbon or wire cools and contracts, the vane is snapped back to its stress-deformed condition in which it is bent about the other bend line. As fully set forth in the above Welsh patent, if such a vane is supported at a certain zone thereof, there is a considerable amplitude of movement of the vane and its attached components about the mounting point during the snapping action. This considerable amplitude of movement may be used to snap open and close a pair of circuit controlling contacts which control the flow of current to the signal lamps.

In accordance with the present invention as applied to the vane type of flasher, a bleeding resistor is electrically and mechanically connected to the pull ribbon at substantially the center thereof and preferably adjacent a movable contact carried by the pull ribbon and normally engaged with a fixed contact. This resistor is arranged to be connected in shunt with the pull ribbon while the lamps are drawing the relatively heavy current required for the high intensity daytime operation, and thus to reduce the current flow through the pull ribbon during such time. Accordingly, there will be a certain FPM rate and on-time ratio characteristic for the flasher during daytime driving.

During nighttime driving, the bleeding resistor is automatically cut out of circuit so that all of the load current drawn by the lamps flows through the pull ribbon. However, during nighttime operation, the current drawn by the lamps is very substantially reduced and thus the current flow through the pull ribbon is reduced. By proper selection of the value of the bleeding resistor, the current flow through the pull ribbon, assuming that the operating voltage remains at a fixed value, will be the same under both daytime and nighttime driving conditions.

Various arrangements may be used, as will be described more fully hereinafter. For example, dual sets of lamps or dual filament lamps may be used, or a thermostatic operator may be used to cut the resistor in and out of circuit responsive to the two different current drains under daytime and nighttime driving conditions, respectively.

For an understanding of the principles of the invention, reference is made to the following description of typical embodiments thereof as illustrated in the accompanying drawings.

Figure 1:
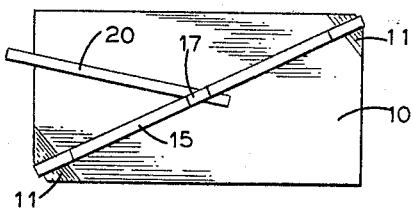
FIG. 1 is a plan view of a vane and pull ribbon, such as used in the aforementioned vane type flasher, and illustrating a bleeder resistor attached to the pull ribbon.
Figure 2:
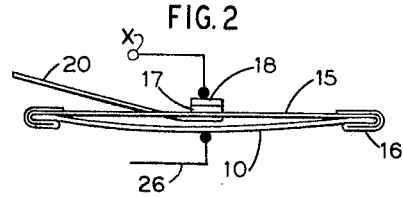
FIG. 2 is a side elevational view of the vane, pull ribbon and bleeder resistor combination shown in FIG. 1.

Referring to FIGS. 1 and 2, the operating elements of a snap action vane type of flasher of the type shown and described in said Welsh Patent No. 2,756,304 are illustrated as including a snap action metal vane 10 and a high resistance heat expansible metal pull ribbon 15. Vane 10 is substantially rectangular and has corners 11, at opposite ends of one diagonal, which may be bent somewhat out of the general plane of vane 10. Vane 10 is pre-stressed or deformed so that it is bent about the diagonal connecting corners 11.

In a manner known to those skilled in the art, pull ribbon 15 is attached to vane 10 at corners 11 thereof, with pull ribbon 15 in its cold and contracted condition. Such attachment may involve, for example, the doubling back of the ends 16 of pull ribbon 15, so that these doubled over ends 16 may be spot welded, brazed, or otherwise electrically and mechanically secured to corners 11 of vane 10. The attachment of pull ribbon 15 to vane 10 constrains vane 10 to a stress-deformed condition in which it is bent about a line extending at an angle to pull ribbon 15.

As is well understood by those skilled in the art, when pull ribbon 15 is heated, either directly by flow of electric current therethrough or indirectly, as by flow of electric current through a heating winding operatively associated therewith, the pull ribbon expands. After a predetermined amount of expansion, vane 10 will snap from the stress-deformed condition to a "restored" position in which it is bent about diagonal 11—11. By a suitable arrangement of load circuit controlling contacts on the movable portion of the vane-pull ribbon combination, such snapping of the vane may be used to open or break the load circuit, for example. When the load circuit is broken or opened, pull ribbon 15 will cool and contract and, after a predetermined amount of contraction, will snap vane 10 from the restored position, in which it is bent about diagonal 11—11, back to the stress-deformed condition.

While the load circuit controlling contacts may be operated by any movable portion of the vane-pull ribbon combination, in the illustrated example they are illustrated as being operated by movement of pull ribbon 15 responsive to snapping of vane 10 between its two positions. For this purpose, pull ribbon 15 carries a movable contact 17 electrically and mechanically secured thereto adjacent its midpoint, and movable contact 17 is normally engaged with a fixed contact 18 mounted on a suitable supporting bracket which is immovable during movement of the vane-pull ribbon combination. Furthermore, in the illustrated arrangement, contacts 17 and 18 are illustrated as normally closed, although it will be understood by those skilled in the art that the load circuit controlling contacts could be normally open, particularly in a snap action vane of the type in which pull ribbon 15 is indirectly heated by a heater winding operatively associated therewith rather than being heated directly by flow of load current therethrough.

In accordance with the invention, a bleeder resistor 20, shown in FIGS. 1 and 2 as a strip or ribbon of high electrical resistance material, such as "Nichrome," for example, is mechanically and electrically connected to pull ribbon 15 adjacent the midpoint of the latter and on the side of pull ribbon 15 opposite to that carrying movable contact 17. In a manner to be described, bleeder resistor 20 is utilized to bleed current from the pull ribbon, or partially to bypass the pull ribbon circuitwise, during daytime operation of an automotive vehicle so that current flow through pull ribbon 15 is reduced substantially. As a matter of fact, the current flow through pull ribbon 15, by suitable design of the constants of bleeder resistor 20, may be reduced, when the bleeder resistor is in operative circuit relation with the pull ribbon, to the value of the current which would flow through pull ribbon 15 during nighttime driving when bleeder resistor 20 is cut out of operative circuit relation but during which the rear signal lamps draw substantially less current than during daytime operation. Thus, the operating rate of the vane-pull ribbon combination, or the FPM rate thereof, is maintained at a substantially fixed value during both daytime and nighttime driving, and correspondingly the on-time ratio is also maintained at a substantially fixed value irrespective of whether the vehicle is being operated during the daytime or during nighttime.

FIGS. 3 through 6 are schematic wiring diagrams which illustrate various automotive vehicle turn signal arrangements using the vane-pull ribbon combination illustrated in FIGS. 1 and 2. Each of the arrangements illustrated in FIGS. 3 through 6 includes means for maintaining bleeder resistor 20 in operative circuit relation with pull ribbon 15 during daytime driving conditions, and for cutting bleeder resistor 20 out of circuit during nighttime driving conditions. As certain parts and components are identical for all four modifications illustrated, the same reference numerals are used to indicate like or corresponding parts in each of FIGS. 3, 4, 5 and 6.

In each of the automotive vehicle turn signal systems illustrated in FIGS. 3, 4, 5 and 6, the thermomotive flasher is illustrated as having a terminal X, which is the input terminal, connected to the vehicle carried source of electrical energy and which is herein schematically illustrated as a battery 25 having one terminal grounded and the other terminal connected to input terminal X of the flasher. Each flasher is also illustrated as having an output or load terminal L. The various signal lamps in the four schematic wiring diagrams are illustrated as of the type normally having one terminal grounded, as is customary in automotive vehicle practice. A headlamp control switch HCS is illustrated in each of the figures, and in accordance with the invention this headlamp control switch is provided with additional switch means which, responsive to movement of the headlamp control switch between its off position and either of its on positions, automatically conditions the turn signalling system for either daytime driving or nighttime driving. Thus, switch HCS is illustrated as having the usual "parking lamps," "headlamps," and "tail lamps" output terminals, with the tail lamps being energized when the switch is positioned for either "parking lamps on" or "headlamps on."

Figure 3:
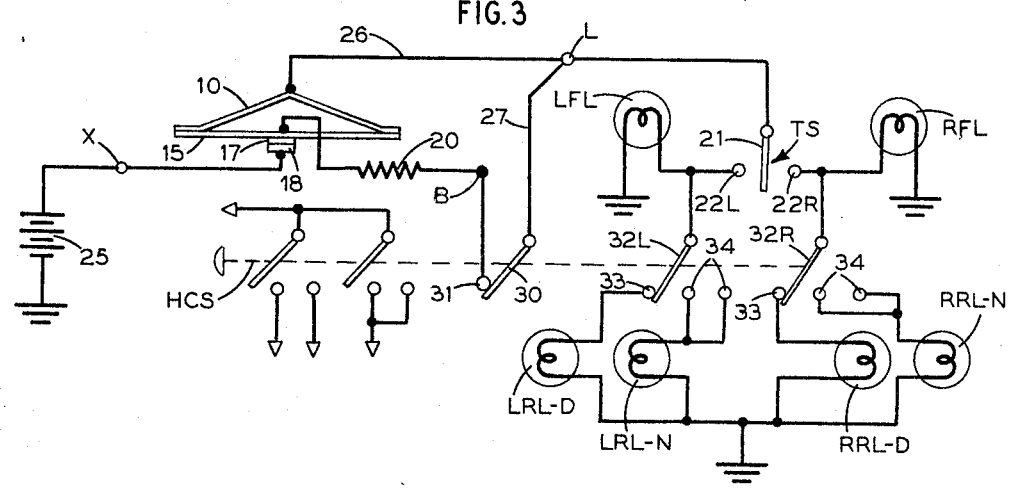
FIG. 3 is a schematic wiring diagram of an automotive vehicle turn signalling system embodying the invention and utilizing different intensity rear signal lamps for daytime and nighttime driving.

In the embodiment of the invention illustrated in FIG. 3, the turn signal system includes front signal lamps LFL and RFL, as well as rear signal lamps. In the particular arrangment illustrated, there are two sets of rear signal lamps, one operable for signalling during daytime driving and the other operable for signalling during nighttime driving. Thus, rear signal lamps LRL–D and RRL–D are utilized during daytime driving, whereas rear signal lamps LRL–N and RRL–N are used during nighttime driving. For example, the daytime rear signal lamps may have a candlepower of 32 whereas the nighttime signal lamps might, for example, 12 candlepower. While illustrated as separate lamps, it will be clear that the rear signal lamps could be dual filament lamps with two filaments within the same lamp enclosure. Also, it is possible to use both lamps for daytime driving to attain a sufficiently visible signal, with only the lower candle powered lamp being used for nighttime driving.

A turn signal switch generally designated TS has a movable contact arm 21 connected to load terminal L of the flasher which is, in turn, connected by a conductor 26 directly to vane 10. Arm 21 is selectively engageable with either of a pair of contacts 22L or 22R depending upon which direction of turning movement is to be effected. The front signal lamps LFL and RFL are directly connected to the respective contacts 22L and 22R. However, connection of the rear signal lamps to the contacts 22L and 22R is under the control of means operated by headlamp switch CS so that, when switch HCS is in its "off" position, during daytime driving, the lamps LRL–D and RRL–D will be connected to contacts 22L and 22R, respectively, and when switch HCS is in either of its "on" positions, during nighttime driving lamps LRL–N and RRL–N will be connected to the respective contacts 22L and 22R.

In FIG. 3, a movable contact arm 30 and a cooperating contact 31 are operatively associated with resistor 20, and contact arm 30 is operable by the headlamp control switch HCS. Contact 31 is connected by means of a conductor 39 to a bleeder terminal B which in turn is connected to the outer end of the resistor 20. Armature or movable contact arm 30 is connected by a conductor 27 to the load terminal L. Headlamp control switch HCS further operates movable contact arms 32L and 32R.

In the "off" position of switch HCS, each arm 32 is engaged with a daytime contact 33 whereas, in either "on" position of switch HCS, contact arms 32 are engaged with either of a pair of nighttime contacts 34. Arms 32L and 32R are connected to the respective contacts 22L and 22R of turn signal switch TS. Each contact 33 is connected to a daytime driving rear signal lamp, and each pair of contacts 34 is conjointly connected to a nighttime rear signal lamp, as illustrated. Thus, with switch HCS in the "off" position, resistor 20 is connected to load contact L to bleed off current from pull ribbon 15, and switch arms 32L and 32R are engaged with daytime contacts 33.

Under these conditions, when switch HCS is in the "off" position, if turn signal switch TS is operated in either direction from a neutral position, the lamps on either the left or the right side of the vehicle will be flashed through the flasher comprising the vane 10, pull ribbon 15 and bleeder resistor 20. It should be understood that when the daytime driving signal lamps LRL–D and RRL–D are energized, there is a much heavier current drain, due to the higher candlepower of these lamps, than is the case with the nighttime driving rear signal lamps LRL–N and RRL–N. Accordingly, the amount of current flowing through the vane-pull ribbon combination of the flasher would normally be much greater under daytime driving conditions than under nighttime driving conditions, resulting in a faster rate of operation and a decreased "on" time ratio for the flasher during daytime driving. By the provision of bleeder resistor 20 connected to pull ribbon 15, current is bled from the pull ribbon so that the actual current effective thereon is reduced to a value which corresponds to what would be drawn during nighttime operation. Thus, the flashing rate of the flasher is maintained, during daytime operation, at a value equivalent to its flashing rate during nighttime operation.

When switch HCS is moved to either the "parking lamps on" or "headlamps on" positions, contact arm 30 is disengaged from contact 31, and contact arms 32 are disengaged from contacts 33 and engaged with one or the other of contacts 34 depending upon the "on" position of switch HCS. Thus, resistor 20 is effectively cut out of circuit, and turn signal switch TS is connected to nighttime signal lamps LRL–N and RRL–N.

It will be noted that the changeover from daytime signalling conditions to nighttime signalling conditions is effected without any attention on the part of the operator, and responsive to operation of headlamp switch HCS to either of its "on" positions. This is an important feature, as it is highly desirable that such changeover be effected without conscious attention on the part of the driver.

Figure 4:
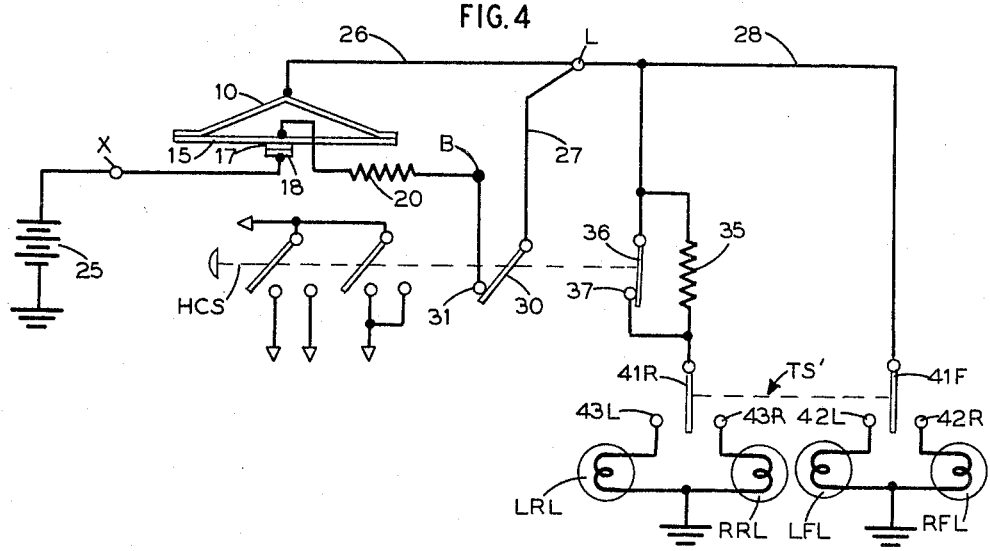
FIG. 4 is a schematic wiring diagram of an automotive vehicle turn signalling system provided with a dropping resistor whicih is automatically cut into series with the rear signal lamps responsive to operation of a headlamp control switch to an "on" position.

FIG. 4 illustrates an alternative embodiment of the invention in which the same rear signal lamps are used for daytime driving as are used for nighttime driving, with a voltage dropping resistor being cut into circuit with the rear signal lamps automatically and in response to operation of headlamp control switch HCS to either of its "on" positions. In this embodiment of the invention, a turn signal switch TS' is provided including interconnected movable contact arms 41R, for the rear signal lamps, and 41F, for the front signal lamps. Contact arm 41F is connected directly to load terminal L of the flasher by a conductor 28. Contact arm 41R is connected to load terminal L through a dropping resistor 35 which, during daytime driving, is shunted by a movable contact arm 36 engaged with a contact 37, contact arm 36 being moved to disengage contact 37 whenever switch HCS is moved to either of its "on" positions. Depending upon the direction of the projected turn, contact arm 41F is engageable with either a contact 42L or a contact 42R, and contact arm 41R is engageable with either a contact 43L or a contact 43R. Contacts 42 and 43 are connected to the front and rear signal lamps, respectively, on each side of the vehicle.

FIG. 4 shows the turn signalling arrangement in the daytime driving condition wherein dropping resistor 35 is shunted by contact arm 36 and contact 37. Under these conditions, both the front and rear lamps are illuminated with high brilliancy responsive to operation of turn signal switch TS'. During nighttime driving, when switch HSC is moved to either "on" position, contact arm 36 is simultaneously disengaged from contact 37 so that dropping resistor 35 is now in series with turn signal switch movable arm 41R. Consequently, when the switch TS' is operated in either direction, front lamps LFL and RFL will be illuminated with the same brilliance as during daytime driving, which is an advantage due to their being located adjacent the headlamps of the vehicle. However, rear signal lamps LRL and RRL will be illuminated at a greatly reduced brilliancy as compared to their illumination during daytime driving. It will be noted that whenever switch HCS is turned to either of its "on" positions, contact arm 30 is disengaged from contact 31 to cut bleeder resistor 20 out of the circuit. Thus, the current drawn through the pull ribbon 15 remains at substantially the same value under both daytime and nighttime driving conditions so that the flasher will operate at substantially the same FPM rate and on-time ratio under daytime and nighttime driving conditions. The distinction between the system of FIG. 4 and that of FIG. 3 is that the dropping resistor 35 is provided to reduce the voltage drop across the rear signal lamps, rather than using separate rear signal lamps or rear signal lamp filaments for daytime and nighttime driving as in the arrangement of FIG. 3.

Figure 5:
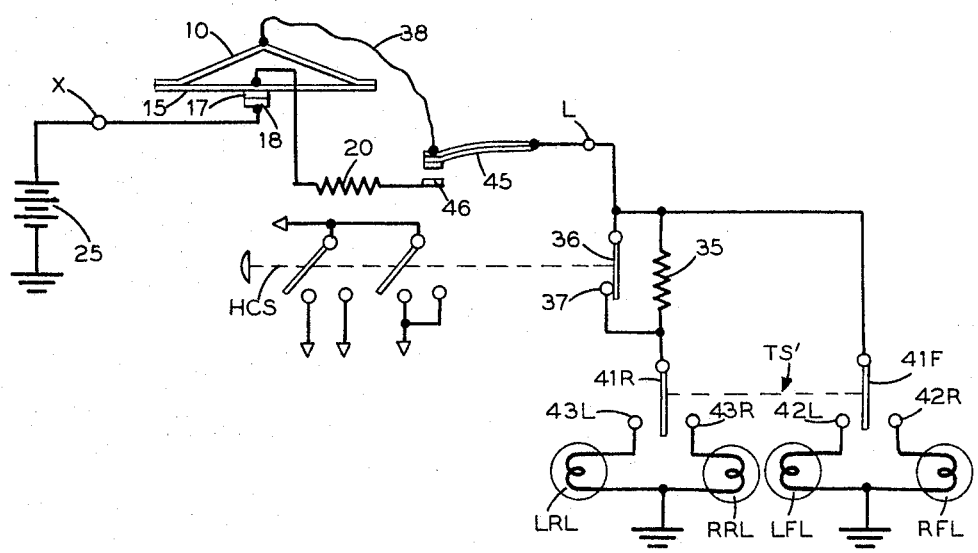
FIG. 5 is a schematic wiring diagram illustrating a modification of the arrangement shown in FIG. 4 in which the bleeder resistor is automatically cut into and out of circuit responsive to the operation of a thermal or bimetallic element.

FIG. 5 shows an arrangement which is substantially the same as that of FIG. 4 except that, in the arrangement of FIG. 5, the cutting of bleeder resistance 20 in and out of circuit is effected by a bimetallic or other thermomotive element responsive to the current drawn by the signal lamps. In FIG. 5, a bimetal or other thermomotive arm 45 is provided and is connected to load terminal L and also, by a conductor 38, to vane 10. Conductor 38 is preferably a pigtail or flexible conductor to allow for deflection movement of bimetal 45. Bimetal 45 is in operative association with a contact 46 connected to the outer end of bleeder resistor 20.

Under daytime driving conditions, with switch HCS off and arm 36 engaged with contact 37, the current drawn by the signal lamps upon closure of turn signal switch TS' in either direction is sufficient that the current flow through bimetal 45 will heat the latter to deflect to engage contact 46 and this cut bleeder resistor 20 into effective shunting circuit relation with pull ribbon 15. When the current drawn by the lamp is reduced, during nighttime driving, by removal of shunt 36–37 to place dropping resistor 35 effectively in series circuit, the current drawn through bimetal 45 is insufficient to maintain the latter deflected and thus it disengages contact 46 to effectively cut bleeder resistor 20 out of circuit. Aside from the cutting in and out of circuit of bleeder resistor 20 being effected by a thermomotive element rather than by a contact arm operated by switch HCS, the arrangement of FIG. 5 operates in the same manner as does that of FIG. 4.

Figure 6:
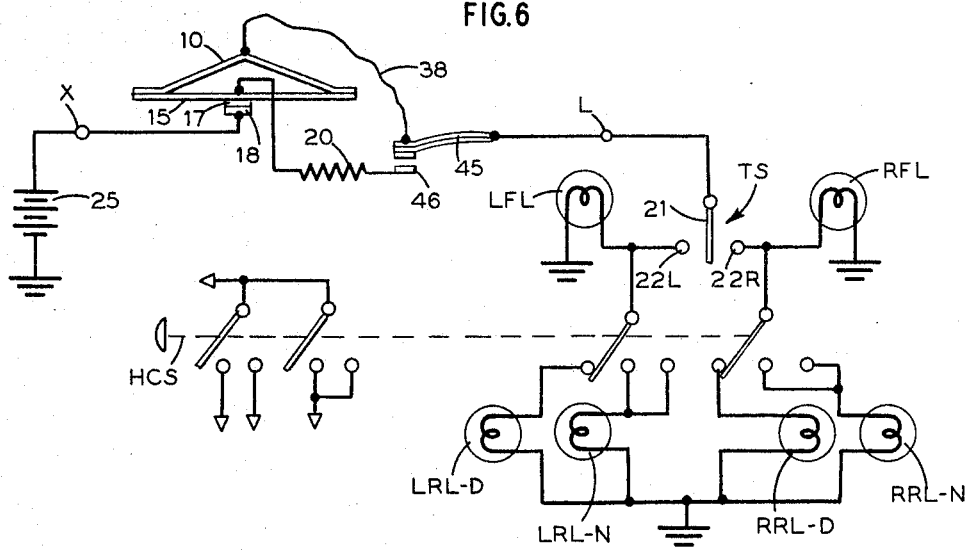
FIG. 6 is a schematic wiring diagram, somewhat similar to FIG. 5, but illustrating an alternate arrangement of turn signal switch and signal lamps.

FIG. 6 ilustrates an arrangement which is a combination of that of FIG. 5 and that of FIG. 3. In other words, two sets of rear signal lamps are used, rather than a single set of lamps. The arrangement of FIG. 6 operates in the same manner as that of FIG. 5 and also that of FIG. 3. The exception is that, instead of a contact arm associated with switch HCS controlling cutting in and out of bleeder resistor 20, the latter is cut in and out of circuit by operation of bimetal 45. During daytime driving, the current drawn by the signal lamps has a value such that the flow of current through bimetal 45 is sufficient to deflect the latter, due to heating thereof, into engagement with contact 46. This cuts bleeder resistor 20 effectively into circuit with pull ribbon 15. Under nighttime driving conditions, the current drawn by the signal lamps, and thus the current flow through bimetal 45, is insufficient to heat the latter enough to maintain it deflected into engagement with contact 46. Consequently, bimetal 45 disengages contact 46 effectively cutting bleeder resistor 20 out of circuit.

While specific embodiments of the invention have been shown and described in detail to illustrate the application of the principles of the invention, it will be understood that the invention may be embodied otherwise without departing from such principles.

What is claimed is:

1. An automotive vehicle turn signal system comprising, in combination, a source of potential; signal lamp means selectively operable at a relatively high intensity for daytime use and at a relatively low intensity for nighttime use; selector means operable, responsive to conditioning of the vehicle for daytime operation, to select said lamp means for operation at said relatively high intensity and, responsive to conditioning of the vehicle for nighttime operation, to select said lamp means for operation at such relatively low intensity; a cyclically operable thermomotive circuit breaker having an input terminal connected to said source, and a load terminal; said circuit breaker including a snap action member and an electrically resistive thermally expansible operator secured to said member and controlling snapping thereof between two positions, said circuit breaker further including a pair of load circuit controlling contacts operated between open and closed positions responsive to such snapping of said member between said two positions; means connecting said contacts and said operator in series between said input and load terminals; a manually operable switch selectively operable to connect said lamp means to said load terminal; a bleeder resistor; a second switch; and means connecting said bleeder resistor and said second switch in series between said contacts and said load terminal to form a series circuit in parallel with said operator; said second switch being operable, responsive to conditioning of the vehicle for daytime operation, to a closed position and, responsive to conditioning of the vehicle for nighttime operation, to an open position; said bleeder resistor having an ohmic value sufficient to reduce the load current flow through said operator, during daytime operation of said signal lamp means, to a value substantially equal to the load current drawn by said signal lamp means during nighttime operation thereof.

2. An automotive vehicle turn signal system comprising, in combination, a source of potential; a headlamp control switch controlling energization of the vehicle driving lamps; signal lamp means selectively operable at a relatively high intensity for daytime use and at a relatively low intensity for nighttime use; selector means operable by said headlamp control switch in the off position of the latter selecting said lamp means for operation at such relatively high intensity, said selector means, in an on position of said headlamp control switch, selecting said lamp means for operation at such relatively low intensity; a cyclically operable thermomotive circuit breaker having an input terminal connected to said source, and a load terminal; said circuit breaker including a snap action member and thermally expansible operator secured to said member and controlling snapping thereof between two positions, said circuit breaker further including a pair of load circuit controlling contacts operated between open and closed positions responsive to such snapping of such member between said two positions; a manually operable switch selectively operable to connect said lamp means to said load terminal; means connecting said contacts and said operator in series between said input and load terminals; a bleeder resistor; a second switch operable by said headlamp control switch; and means connecting said bleeder resistor and said second switch in series between said contacts and said load terminal to form a series circuit in parallel with said operator; said second switch being closed in the off position of said headlamp control switch and open in said on position thereof, said bleeder resistor having an ohmic value sufficient to reduce the load current flow through said operator, during daytime operation of said signal lamp means, to a value substantially equal to the load current drawn by said signal lamp means during nighttime operation thereof.

3. A cyclically operable circuit breaker having an input terminal for connection to a source of potential, and a load terminal for connection to a load; a snap action member; an electrically resistive thermally expansible operator secured to said member and controlling snapping thereof between two positions; said operator being movable between two positions responsive to movement of said member between said two positions; a pair of load circuit controlling contacts including a fixed contact connected to said input terminal and a movable contact carried by and electrically and mechanically connected to an intermediate portion of said operator and normally engaged with said fixed contact; means electrically connecting said operator to said load terminal; a bleeder resistor having one end electrically and mechanically secured to said operator adjacent said movable contact; and a switch device connected between the other end of said bleeder resistor and said load terminal and selectively operable to connect said other end of said bleeder resistor to said load terminal.

4. A cyclically operable thermomotive flasher, as claimed in claim 3, in which said snap action member is a snap action vane of electrically conductive metal and constitutes the means connecting said operator to said load terminal; said operator comprising a strip of electrically conductive metal secured at its opposite ends to corners of said vane and, in the cold and contracted condition, constraining said vane to a stress-deformed position; said vane, upon heating and expansion of said operator due to load current flow through the latter, snapping to a restored condition to move said operator to disengage said movable contact from said fixed contact; said bleeder resistor comprising an electrically conductive resistive element extending laterally from said operator.

5. A cyclically operable thermomotive circuit breaker, as claimed in claim 4, in which said operator is a ribbon of electrically resistive metal carrying said movable contact on its outer surface adjacent its midpoint; said bleeder element electrically and mechanically secured to the inner surface of said pull ribbon opposite said movable contact.

6. An automotive vehicle turn signal system, as claimed in claim 2, in which each signal lamp means includes a pair of signal lamps connected in parallel with each other to the opposite terminal of said source; one signal lamp of each pair having a relatively low candle power rating and the other signal lamp of each pair having a relatively high candle power rating; said selector means including a third switch operable by said headlamp control switch to selectively connect either the low candle power signal lamp or the high candle power signal lamp of each pair to said manually operable switch in accordance with whether said headlamp control switch is in its on position or in its off position, respectively.

7. An automotive vehicle turn signal system, as claimed in claim 2, in which each signal lamp means includes a relatively low candle power filament and a relatively high candle power filament, said filaments being connected in parallel to the opposite terminal of said source; said selector means comprising a third switch operable by said headlamp control switch and, in the on position of said headlamp control switch, connecting said low candle power filaments to said manually operable switch and, in the off position of said headlamp control switch, connecting said high candle power filaments to said manually operable switch.

8. An automotive vehicle turn signal system, as claimed in claim 2, including a voltage dropping resistor; means connecting said voltage dropping resistor and said manually operable switch in series between said load terminal and said signal lamp means; said selector means comprising a third switch operable by said headlamp control switch and connected in parallel with said voltage dropping resistor; said third switch being closed in the off position of said headlamp control switch and being opened in the on position of the latter.

9. An automotive vehicle turn signal system, as claimed in claim 2, in which said second switch comprises an elongated thermomotive arm connected in series between said contacts and said load terminal, said arm having a contact at its free end movable therewith, upon heating of said thermomotive arm, to engage a fourth contact connected to an end of said bleeder resistor; said thermomotive arm, when said lamp means is operating during daytime driving, having a load current flow therethrough of a value sufficient to heat said arm to deflect to engage said third and fourth contacts to connect said bleeder resistor to said load terminal; said arm, when the load current flow therethrough corresponds to nighttime operation of such signal lamp means, having insufficient load current flow therethrough to deflect to engage said third contact with said fourth contact.

10. An automotive vehicle turn signal system, as claimed in claim 9, in which said thermomotive arm is a bimetal arm.

References Cited by the Examiner
UNITED STATES PATENTS 2,806,921 9/1957 Welsh _____ 200—122.2
3,148,306 9/1964 Onksen et al.

NEIL C. READ, *Primary Examiner.*

I. J. LEVIN, *Assistant Examiner.*